(12) United States Patent
Filippini

(10) Patent No.: US 6,540,600 B1
(45) Date of Patent: Apr. 1, 2003

(54) FISH SKINNER

(76) Inventor: Joseph D. Filippini, 11009 Cozy Croft, Chatsworth, CA (US) 91311

( * ) Notice: Subject to any disclaimer, the term of this patent is extended or adjusted under 35 U.S.C. 154(b) by 5 days.

(21) Appl. No.: 09/760,184

(22) Filed: Jan. 12, 2001

(51) Int. Cl.$^7$ ................................................ A22C 25/06
(52) U.S. Cl. ........................ 452/195; 452/196; 452/105
(58) Field of Search ................... 452/6, 75, 17, 452/104, 132, 195, 196

(56) References Cited

U.S. PATENT DOCUMENTS

| | | | |
|---|---|---|---|
| 2,110,341 A | * | 3/1938 | Rindt .......................... 452/195 |
| 2,586,732 A | * | 2/1952 | Sohier ......................... 452/195 |
| 2,741,061 A | * | 4/1956 | Harrison ...................... 452/196 |
| 2,795,814 A | * | 6/1957 | Gaultney ...................... 452/195 |
| 3,248,751 A | * | 5/1966 | Wilborn ....................... 452/195 |
| 4,378,613 A | | 4/1983 | Crouch ........................... 17/62 |
| 4,483,048 A | | 11/1984 | Jackson ......................... 17/68 |
| 4,602,404 A | | 7/1986 | Betnar ........................... 17/56 |
| 4,815,169 A | * | 3/1989 | Valleau ........................ 452/195 |
| 5,507,690 A | | 4/1996 | Eide ............................ 452/161 |
| 5,626,513 A | | 5/1997 | Curtis ......................... 452/125 |
| 5,944,596 A | * | 8/1999 | Hargrove ...................... 452/195 |
| 6,123,615 A | * | 9/2000 | Reber .......................... 452/195 |

FOREIGN PATENT DOCUMENTS

JP 03072838 * 3/1991 ........... A22C/25/08

* cited by examiner

*Primary Examiner*—Peter M. Poon
*Assistant Examiner*—Joan M. Olszewski
(74) *Attorney, Agent, or Firm*—Joseph N. Breaux

(57) ABSTRACT

A fish skinner for removing the skin from a fish filet that includes a cutting block in connection with a pivoting cover plate wherein the cutting block has a recess for receiving the skin of the fish filet and the pivoting cover plate is used to hold the fish filet in place while a filet knife is drawn across the top edge of the cutting block to cut the filet free from the fish skin.

1 Claim, 2 Drawing Sheets

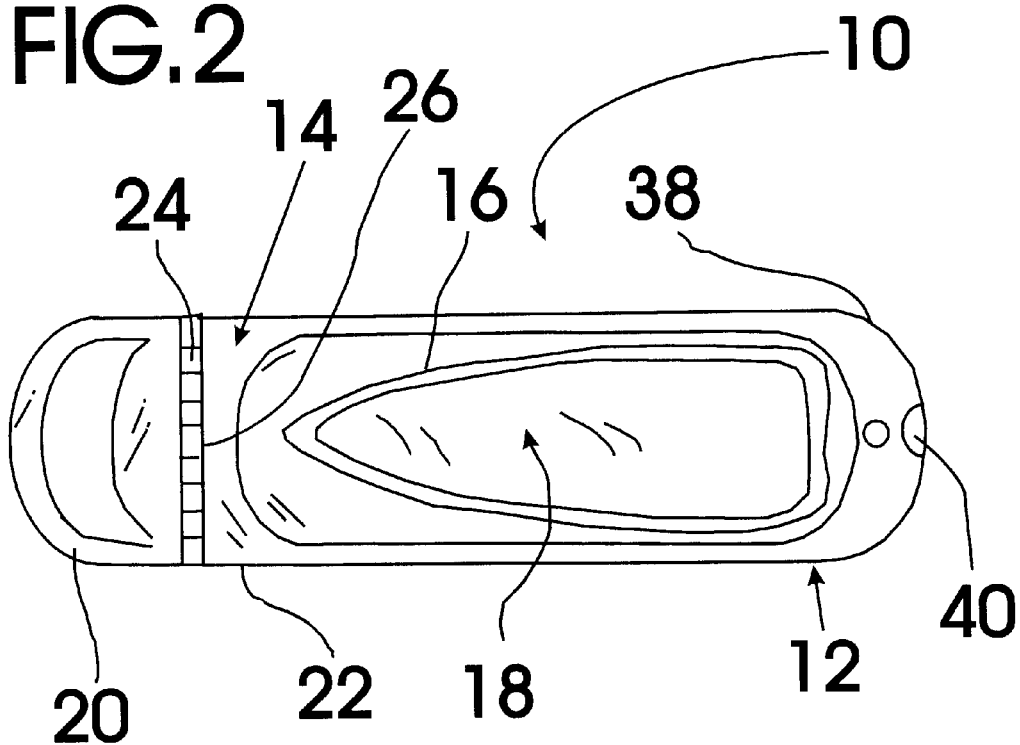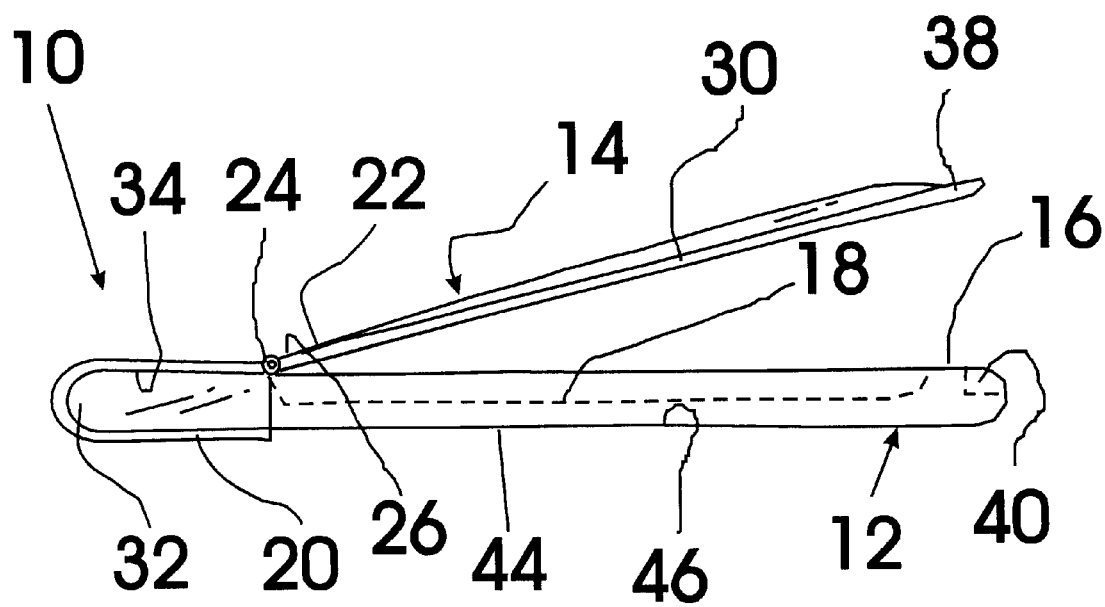

FISH SKINNER

TECHNICAL FIELD

The present invention relates to fish processing equipment and more particularly to a fish skinner system including a cutting board member and a detachable, hinged plastic cover assembly; the cutting board member having top cutting board surface with a fish skin receiving recess formed into a central top area thereof of a depth of about three-sixteenths of an inch and sized to receive a fish filet with the skin side down within the fish skin receiving recess; the detachable hinged plastic cover assembly having a cutting board end receiving attachment structure that is hingedly attached to a cover plate along a cover plate hinged end of the cover plate; the cover plate being of a length such that, when a cutting board handle end is positioned into a cutting board end receiving cavity of the cutting board end receiving attachment structure, a cover plate distal end edge of the cover plate that is opposite the cover plate hinged end is positionable adjacent to a cutting board far end edge of the cutting board that is opposite the cutting board handle end; the cutting board having a non-skid material on a bottom cutting board surface; the cover plate being pivotal toward the top cutting board surface in a manner to apply a holding force against a fish positioned skin side down in fish skin receiving recess of the top cutting board surface. In a fish skin removal method using the fish skinner of the present invention, a fish filet is positioned with the skin side in the fish skin receiving recess of the cutting board, the cover plate is pushed down on to hold the fish filet in a fixed position with respect to the cutting board and a filet knife is moved along the top cutting board surface cutting through the fish filet directly over the skin as it is moved along the length of the filet with the result being that the fish skin is separated from the remainder of the fish filet in a quick and easy fashion with very little waste.

BACKGROUND OF INVENTION

It is often difficult for a person cleaning fish to flatten and secure the fish while trying to remove the skin from the filet meat of the fish. It would be a benefit, therefore, to have a cover plate and cutting block combination which provided a recess to hold the fish section with the skin down and would allow the user to press down on the cover plate with one hand while moving a filet knife horizontally along the upper surface of the board with the other hand. Since the cutting board has a recess the skin is held in the recess while the cutting blade cuts through the filet meat and is all of the skin

SUMMARY OF INVENTION

It is thus an object of the invention to provide a fish skinner which includes a rectangular cutting board approximately 21 inches long having a 3/16 inch hollowed-out tray type recess along the center thereof. The ends of the device would be rounded and the entire perimeter would also be rounded for comfort. A hinge plastic cover plate with the same length and width of the cutting board would slip onto the end of the board in a manner that would allow the plate to be raised up above the recessed area to insert the filet and then pushed down with the hand to hold the filet in place while the skin is being removed. The bottom of the cutting board is provided with a non-skid type surface to help keep the cutting board from moving while the process is accomplished.

Accordingly, fish skinner is provided. The fish skinner includes a rectangular cutting board approximately 21 inches long having a 3/16 inch deep fish skin receiving recess formed through and along the center thereof and a hinged plastic cover plate with the same length and width of the cutting board. In a preferred embodiment of the fish skinner, the cover plate is contoured to accommodate sections of the body of a fish. In another preferred embodiment of the fish skinner, the cover plate has a central open area that is covered by a flexible mesh material secured to the cover plate. The flexible mesh material providing a gripping mechanism for holding the fish securely when the cover plate is pushed down toward the top cutting board surface.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 1 shows a side plan view of a first exemplary embodiment the fish skinner of the present invention.

FIG. 2 shows a top plan view of the fish skinner of FIG. 1.

EXEMPLARY EMBODIMENTS

Figure 4:
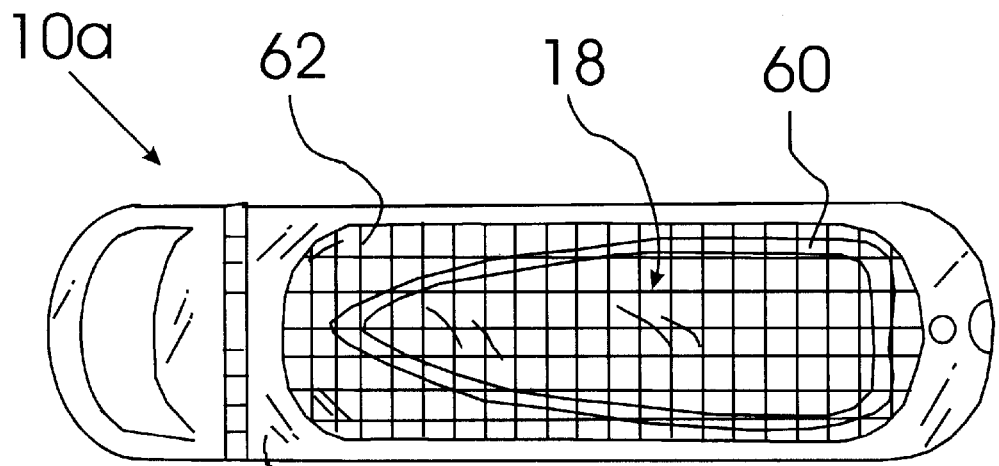
FIG. 4 shows a top plan view of the fish skinner of FIG. 3.

FIGS. 1 and 2 show various aspects of a first exemplary embodiment of the fish skinner of the present invention generally designated 10. Fish skinner 10 includes a cutting board member, generally designated 12, and a detachable, hinged plastic cover assembly, generally designated 14.

Cutting board member 12 has top cutting board surface 16 with a fish skin receiving recess 18 formed into a central top area thereof of a depth of about three-sixteenths of an inch and sized to receive a fish filet with the skin side down within the fish skin receiving recess. Cutting board 12 has a non-skid material 44 on a bottom cutting board surface 46 thereof.

Detachable hinged, transparent plastic cover assembly 14 has a cutting board end receiving attachment structure 20 that is hingedly attached to a cover plate 22 by a hinge 24 along a cover plate hinged end 26 of cover plate 22. Cover plate 22 has a contoured surface 30 for receiving the flesh portion of a fish filet when the skin portion of the fish filet is positioned in fish skin receiving recess 18. Cover plate 22 is of a length such that, when a cutting board handle end 32 is positioned into a cutting board end receiving cavity 34 of cutting board end receiving attachment structure 20, a cover plate distal end edge 38 of cover plate 22 that is opposite the cover plate hinged end 26 is positionable adjacent to a cutting board far end edge 40 of cutting board 12 that is opposite the cutting board handle end 32.

In an exemplary fish skin removal method of the invention, the fish skin is removed from a fish filet having a skin side by a) providing a fish skinner 10 as previously described; b) positioning the skin side of the fish filet in the fish skin receiving recess 18; c) pushing down on cover plate 22 to hold the fish filet in a fixed position with respect to the cutting board 12; and d) moving a filet knife along the top cutting board surface 16 cutting through the fish filet directly over the skin as the filet knife is moved along the length of the dish filet with the result being that the fish skin is separated from the remainder of the fish filet in a quick and easy fashion with very little waste.

Figure 3:
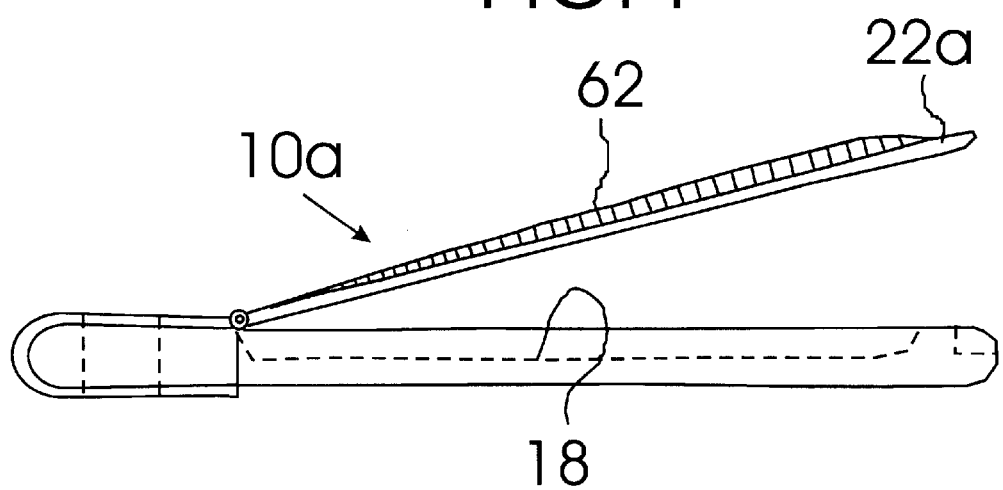
FIG. 3 shows a side plan view of a second exemplary embodiment the fish skinner of the present invention.

FIGS. 3 and 4 show a second exemplary embodiment of the fish skinner of the present invention generally designated 10a. Fish skinner 10a is identical to fish skinner 10 of FIGS. 1 and 2 except that the cover plate 22 of fish skinner 10 is replaced in the fish skinner 10a with a cover plate 22a having a central cut out area 60 that is covered with a flexible fabric mesh 62.

It can be seen from the preceding descriptions that a fish skinner and a fish skinning method have been provided.

It is noted that the embodiment of the fish skinner described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A fish skinner comprising:

a cutting board member; and a detachable, hinged plastic cover assembly;

the cutting board member having a top cutting board surface with a fish skin receiving recess formed into a central top area thereof;

the detachable hinged plastic cover assembly having a cutting board end receiving attachment structure that is hingedly attached to a cover plate along a cover plate hinged end of the cover plate;

the cover plate being pivotal toward the top cutting board surface in a manner to apply a holding force against a fish positioned skin side down in the fish skin receiving recess of the top cutting board surface;

the cover plate having a central cut out area that is covered with a flexible fabric mesh.

* * * * *